July 6, 1954   L. M. ATWOOD   2,682,725
MOLDING FORM
Filed Nov. 5, 1951
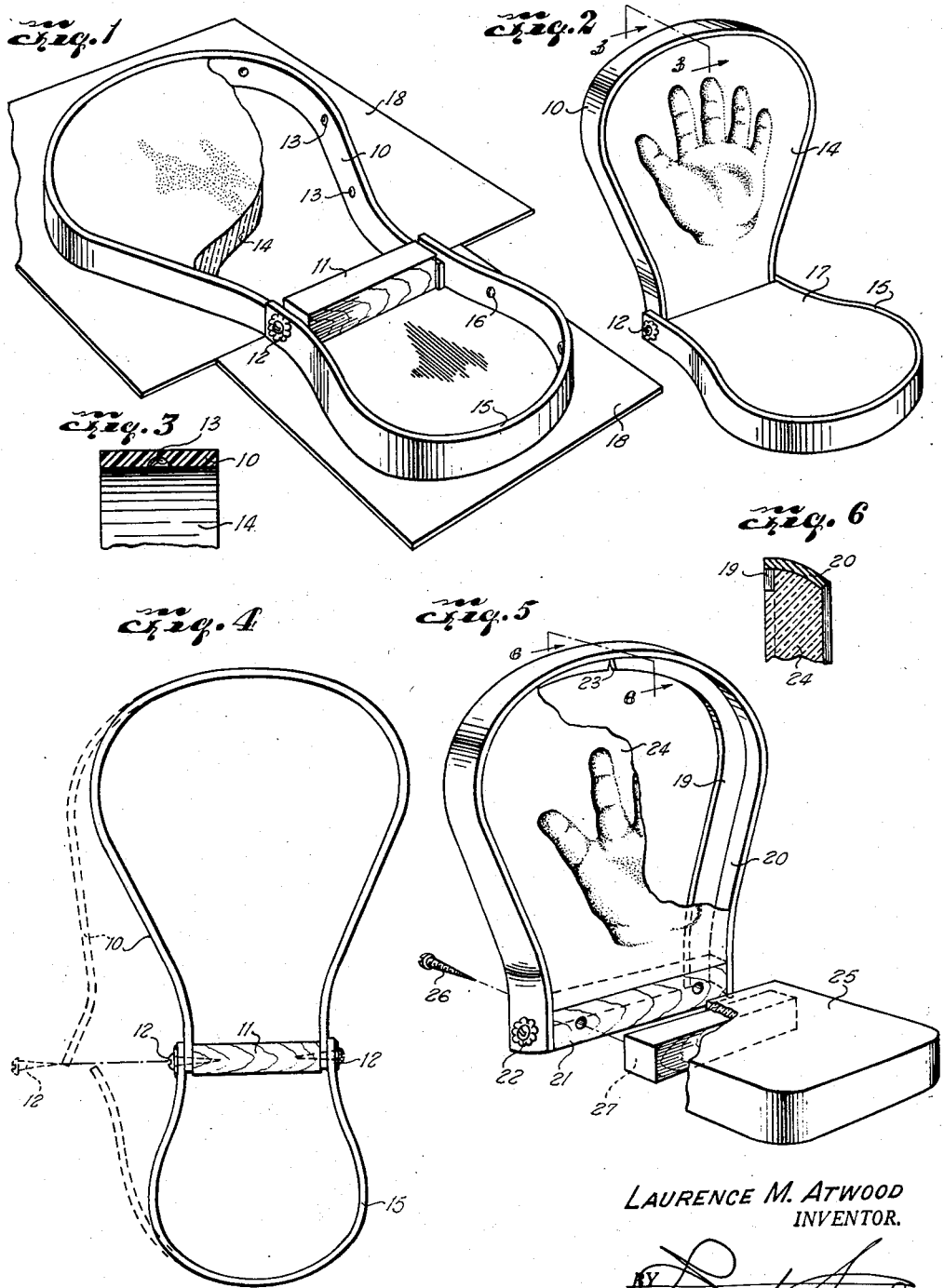
LAURENCE M. ATWOOD
INVENTOR.
ATTORNEY Patented July 6, 1954

2,682,725

UNITED STATES PATENT OFFICE 2,682,725

MOLDING FORM

Laurence M. Atwood, Dallas, Tex.

Application November 5, 1951, Serial No. 254,853

3 Claims. (Cl. 41—24)

This invention relates to moulding kits and it has particular reference to a plaster form designed for use by persons desiring mementos of their children's hands or footprints.

The principal object of the invention is to provide a form into which is poured plaster of Paris or other self-hardening composition, to receive impressions of the hand or foot of a child, the mould being in two pivotally related parts which, in their initial position, are exposed on the same horizontal plane to receive the self-hardening composition, but in the article of utility after hardening of the composition, one part of the form is moved into right angular relationship with the companion part whereupon the parts are fixed in such relationship to constitute a book end.

Another object of the invention is to provide a moulding kit including a mould or form of metal or plastic which becomes a completed article which, in the present case, is a book end. The material of the form, where plastic or metal is possessed of a certain amount of inherent resiliency and is normally held in a definite shape by screws or other fastening means which latter when released, permits the form to expand and disengage the product of the mould in cases where mistakes or undesirable impressions have been made, necessitating remoulding for a new impression.

Still another object of the invention is to provide, as a new article of manufacture, a book end consisting of moulded parts made up of a base and an upright portion and in which the mould or form becomes a part of the article.

Other objects will appear as the description proceeds, taken in connection with the accompanying drawings wherein Fig. 1 is a perspective view of a mould in which the pivotally related parts are disposed on the same horizontal plane preparatory to filling with composition.

Fig. 2 is a perspective view of a book end constructed with the mould of the present invention.

Fig. 3 is a fragmentary sectional view taken on line 3 of the Fig. 2.

Fig. 4 is a plan view of the mould parts in extended position showing each part released to its own springing action.

Fig. 5 is a perspective view of a modified form of the invention, and

Fig. 6 is a fragmentary sectional view taken on line 6—6 of Fig. 5.

Continuing with a more detailed description of the drawing, reference numeral 10 denotes an impression mould form composed of plastic or rust-proof metals which is preferably of horse-shoe shape, as shown. The ends of the plastic or metal strip forming the mould 10 are secured to the ends of the block 11, preferably of wood, by means of screws 12. Disposed in longitudinally spaced relationship on the inner face of the mould 10 are a series of depressions or indentations 13, whose purpose is to prevent lateral displacement from the mould of the body of impression material 14 constituting the product of the mould. This material may be plaster of Paris, gypsum cement or any other suitable self-hardening compositions capable of taking an impression.

Pivoted also to the ends of the block 11 by means of screws 12 are the ends of a base mould or form 15 which is also substantially horse-shoe shaped except that it is preferably smaller than the part 10 of the mould. This base mould is likewise provided with indentations 16 in its interior surface in order to more securely retain the body 17 of the moulding material, the mould part 15, as well as the mould part 10, becoming a part of the completed article which, in the present case, is a book end.

In Fig. 4 is shown the mould in which one leg of each of the parts 10 and 15 has been released from the block 11 by removal of one of the screws 12, revealing the manner in which the mould parts can be spaced to release the product of each mould part for any reason, such as the making of a bad impression, premature hardening of the composition and the like. After the product of the mould parts has been disposed of, the detached ends of the parts 10 and 15 may be again secured to the block 11 and fresh composition poured into the confines of the mould parts preparatory to the obtaining of new impressions.

To use the mould, the mould parts 10 and 15 are placed in the same horizontal plane on backing material 18, which may be of cardboard. The cardboard is preferably glued to the back edges of the mould parts 10 and 15 to prevent spreading of the composition. It is preferred that the mould part 10 be filled with composition before filling the mould part 15, so that the body of the composition in the latter mould part will not be defaced while the child's hand is being set into the composition in the mould part 10. The child's hand is pressed into the soft composition in the part 10 until a faithful impression is made and upon removal of the hand the composition in the part 10 is allowed to set.

After the composition in the mould part 10 has thoroughly become set, the part 10 is elevated to a position at right angles to the base mould 15, as shown in Fig. 2, the block 11 being rotated 90° between the ends of the part 15. Self-hardening composition is then poured into the base part 15 of the mould and is smoothed even with the top edge of the part 15. After the composition in the base part 15 has thoroughly become set, the backing material 18 may be removed from both mould parts 10 and 15.

In some cases it may be desired to apply a suitable finish to the article, such as paint, lacquer, or the like. It is preferred that this finish not be applied for several days following the completion of the article in order to allow all moisture to evaporate from the composition.

In Figures 5 and 6 is shown a modified form of the invention just described. In this form, the upstanding mould part of the article consists of a substantially horse-shoe shaped metal or plastic strip 19 which is formed with a coextensive flange 20 of arcuate form in transverse section. The strip 19 is secured at its ends to a block 21 by means of screws 22, and in order to permit expansion of the mould, the strip 19 has a substantially V-shaped cut out portion 23 therein midway between its ends. By removal of the screw 22, one leg of the mould may be released from the block 21 to permit the moulded body 24 to be released from the mould. The construction of the retaining wall of the mould in the modified form obviates the necessity for the indentations as provided on the inner surfaces of the mould parts earlier described.

A base portion 25 is provided for the impression mould forming the modified example of the invention and this base portion is attached to the block 21 of the impression mould by screws 26. The base block 25 may be precast with an embedded block 27 for receiving the screws 26.

Manifestly, the construction as shown and described is capable of some modification and such modification as may be construed to fall within the scope and meaning of the appended claims is also considered to be within the spirit and intent of the invention.

What is claimed is:

1. As a new article of manufacture, a frame in pivoted sections comprising a first narrow strip of resilient material in substantially horse-shoe shape defining a retaining wall for a first of said frame sections, and having relatively spaced indentations in its inner surface, a block separating the ends of said strip of resilient material and to which the ends of said strip are detachably and pivotally connected, a second narrow strip of resilient material defining the retaining wall of a second of said frame section, the ends of said second strip being also detachably pivoted to the ends of said block by the same means of attachment thereto of the end of said first strip for disposition of said first frame section at right angles to the plane of said second frame section, and a body of impression receiving material within the confines of each of said frame sections.

2. As a new article of manufacture, a pair of complementary frame parts, each comprising a strip of resilient material formed to define a retaining wall the ends of the strip of one frame part overlapping the ends of the strip of the companion frame part, a body of impression receiving self-hardening material confined within the retaining wall of each of said frame parts, a pivot block, means for pivotally connecting the overlapped ends of said strips to one end of said block and the opposite overlapped ends of said strips to the opposite end of said block for displacement of one of said frame parts, and means in the inner surfaces of each of said frame parts for holding the body of self-hardening composition against lateral displacement therefrom.

3. As a new article of manufacture, a sectional frame comprising a strip of resilient material of substantially horse-shoe shape forming a first section of said frame and defining a retaining wall, a block of thickness equal to the width of said strip, means pivotally connecting one end of said strip to one end of said block and the opposite end of said strip to the opposite end of said block, a body of impression receiving, self-hardening material within the confines of said retaining wall, a base perpendicular to said first section, said base consisting of a resilient strip having its ends overlapping the ends of the strip of said first frame section and pivotally attached to the ends of said block and containing a body of self-hardening material.

References Cited in the file of this patent
UNITED STATES PATENTS

| Number | Name | Date |
|---|---|---|
| 249,167 | French | Nov. 8, 1881 |
| 550,133 | Poulson | Nov. 19, 1895 |
| 873,634 | Thomas | Dec. 10, 1907 |
| 2,057,039 | MacDonald | Oct. 13, 1936 |
| 2,154,169 | Koehler | Apr. 11, 1939 |
| 2,558,650 | Heineman et al. | June 26, 1951 |
| 2,591,565 | Linnard | Apr. 1, 1952 |